(12) United States Patent
Ludwig et al.

(10) Patent No.: US 7,264,568 B2
(45) Date of Patent: Sep. 4, 2007

(54) LOCK DETECTION SENSOR

(75) Inventors: Allan S. Ludwig, Galesburg, MI (US); Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 250 days.

(21) Appl. No.: 11/097,705

(22) Filed: Apr. 1, 2005

(65) Prior Publication Data
US 2005/0250613 A1 Nov. 10, 2005

Related U.S. Application Data

(63) Continuation-in-part of application No. 10/335,670, filed on Jan. 2, 2003, now abandoned.

(51) Int. Cl.
*F16H 48/06* (2006.01)
*F16H 48/20* (2006.01)

(52) U.S. Cl. .............. 475/233; 475/150; 475/151; 475/153; 475/154; 475/230; 475/231; 192/30 W; 192/69.62; 192/84.7; 192/84.92

(58) Field of Classification Search ............... 475/150, 475/151, 153, 154, 230, 231, 233; 192/30 W, 192/35, 69.62, 84.7, 84.92; 340/453
See application file for complete search history.

(56) References Cited

U.S. PATENT DOCUMENTS

| 4,340,133 | A | * | 7/1982 | Blersch ............... 192/30 W |
| 6,083,134 | A | * | 7/2000 | Godlew ............... 475/231 |
| 6,107,761 | A | * | 8/2000 | Seto et al. ............ 318/139 |
| 6,913,129 | B2 | * | 7/2005 | Ezure et al. .......... 192/30 W |

* cited by examiner

*Primary Examiner*—David D. Le
(74) *Attorney, Agent, or Firm*—Bradley J. Diedrich

(57) ABSTRACT

A differential gear mechanism, of either the locking Cr limited slip type, including a gear case rotatably disposed within an outer housing and a mechanism to limit rotation of side gears relative to the gear case; this rotation limiting mechanism including a member which is axially moveable between a first position and a second position. The mechanism includes a sensor assembly and a sensor element disposed adjacent the gear case. The axially moveable member includes a sensed portion surrounding an annular surface of the gear case, and disposed between the annular surface and the sensor element, in one embodiment. Movement of the sensed portion corresponding to changes within the mechanism between unlocked and locked conditions results in the sensor assembly transmitting an electrical output. The vehicle control logic can know the condition of the differential mechanism and control certain other parts or functions of the vehicle accordingly.

10 Claims, 6 Drawing Sheets

LOCK DETECTION SENSOR

CROSS-REFERENCE TO RELATED APPLICATIONS

This application is a continuation-in-part (CIP) of application U.S. Ser. No. 10/335,670, filed Jan. 2, 2003, now abandoned in the name of Allan S. Ludwig and Matthew G. Fox for a "Lock Detection Sensor".

BACKGROUND OF THE DISCLOSURE

The present invention relates to traction modifying differentials, and more particularly, to such differentials of the type in which the differential action may be retarded, and possibly even locked, in response to some sort of an input, for example, an electrical input signal.

Traction modifying differentials of the type to which the present invention relates typically include a gear case defining a gear chamber, and disposed therein, a differential gear set including at least one input pinion gear, and a pair of output side gears. The present invention will be described in connection with a differential of the bevel gear type, although those skilled in the art will understand that the invention is not so limited, and could be utilized in connection with differentials having other gearing types, such as helical or planetary. Typically, a clutch pack is disposed between at least one of the side gears and an adjacent surface of the gear case, such that the clutch pack or locking mechanism is operable to limit relative rotation between the gear case and the one side gear. In most differentials of the type described, engaging the clutch pack or locking mechanism (retarding differentiation) is achieved by one of several different approaches.

In one approach, a "locking differential" of the type illustrated and described in U.S. Pat. No. Re 28,004, assigned to the assignee of the present invention and incorporated herein by reference, the clutch pack is normally disengaged. When one of the wheels begins to spin out, relative to the other wheel, a speed sensitive mechanism senses the speed differential between the wheels, and by means of a cam and ramp mechanism, locks the clutch pack solid. In the incorporated patent, the speed sensitive mechanism comprises a fly-weight mechanism, the output of which comprises the "input", in response to which the differential gearing is locked.

U.S. Pat. No. 5,019,021, also assigned to the assignee of the present invention and incorporated herein by reference, illustrates another approach to retarding differentiation. This patent illustrates and describes a "limited slip differential" in which the loading on the clutch pack may be varied in response to an external electrical input signal, thus varying the amount of slip within the clutch pack. Therefore, the amount of bias torque transmitted from one side gear to the other is also varied in response to changes in the external electric input signal. As is well known to those skilled in the art, in a limited slip differential, there is typically a certain amount of "slip" or speed differential, between the two side gears whenever the vehicle encounters less than optimum traction conditions. In the above-incorporated patent, the "input" to the differential is the electrical input signal, but within the differential, there is another "input" which is the axial movement of one of the plates of a ball ramp actuator, the axial movement of which varies the loading on the clutch pack in a manner which is now generally well known to those skilled in the art.

Finally, in U.S. Pat. No. 6,551,209, also assigned to the assignee of the present invention, there is illustrated a different approach to a "locking differential". In the above-incorporated patent, there is illustrated and described a locking differential in which there is no friction-type clutch pack, but instead, a mechanical locking arrangement. In the differential of the cited patent there is a ball ramp actuator which is able to move a series of pins, in response to an electrical input signal, into mating openings in the differential side gear, thus locking the side gear relative to the differential gear case. For purposes of the present invention, the movement of the pins, toward or away from the side gear, to achieve either a locked condition or an unlocked condition, is also considered an "input" in regard to a means for limiting rotation of an output gear relative to a gear case in a differential.

Thus, it may be seen, from a review of the above-described types of limited slip and locking differentials, that there are a number of different mechanisms known to those skilled in the art which are commonly used to limit (retard), or lock, the relative rotation between a differential gear case and one of the output side gears. However, it should be noted that most of the known, prior art limited slip and locking differential arrangements, and especially those which have been commercialized by the assignee of the present invention, have in common the presence of some sort of member which moves axially, in connection with the operation of the mechanism which achieves the slip limiting or locking function within the differential.

More recently, an increasing percentage of vehicles (especially passenger cars and light trucks) are incorporating some sort of stability, or traction, or safety system into the drive train. Examples of such systems would include a traction control system (TCS), an anti-skid braking system (ABS), and an electronic stability program (ESP). It is quite common, and desirable, for such systems to include some sort of traction modifying device, and preferably, an electrically-actuated limited slip or locking differential. In order for these types of systems to operate most effectively and safely, it is important for the control logic of the system to receive some sort of feedback signal from the differential, whereby the control logic can know, at any given instant, whether the differential is in an actuated (locked) condition, or in an unactuated (unlocked) condition.

Unfortunately, sensing the occurrence of a locked condition (or an unlocked condition) in a locking differential, or sensing an increasing clutch engagement (or a decreasing clutch engagement) in a limited slip differential involves sensing something such as the axial movement of a member within a differential gear case which, typically, is rotating within a stationary outer housing. One seemingly obvious way of mounting a sensor on a rotating differential case is to fix the sensor to the exterior of the case, and transmit the generated electrical signal from the differential to the vehicle microprocessor by means of slip rings. Unfortunately, such an arrangement is typically not feasible. For most differential installations, nothing can be attached to the exterior of the differential case (or extend radially outward therefrom), because, in the axle assembly plant, it must be possible to slide the ring gear over the case outer diameter, and bolt the ring gear to the case flange.

BRIEF SUMMARY OF THE INVENTION

Accordingly, it is an object of the present invention to provide an improved differential gear mechanism of the type described, which overcomes the disadvantages of the known prior art mechanisms, in regard to the capability to sense either a locked (or unlocked) or an actuated (or unactuated) condition.

It is a further object of the present invention to provide an improved differential gear mechanism of either the limited slip or locking type in which it is feasible to sense the occurrence of a locked condition (versus an unlocked condition) or the occurrence of an increasing clutch pack engagement (versus a decreasing clutch pack engagement).

It is a more specific object of the present invention to provide an improved differential gear mechanism which achieves the above-stated objects, with no major redesign of the differential mechanism, or of the overall axle assembly.

It is a still more specific object of the present invention to provide an improved locking differential in which the occurrence of a locked (or unlocked) condition can be sensed utilizing the axial movement, within the differential, of a member which comprises part of the locking mechanism, or of the engagement mechanism.

The above and other objects of the invention are accomplished by the provision of an improved differential gear mechanism including a gear case rotatably disposed within an outer housing and defining an axis of rotation and a gear chamber. Differential gearing is disposed in the gear chamber including at least one input gear and first and second output gears. The mechanism includes means operable to limit rotation of the first output gear relative to the gear case for common rotation therewith. Included is an actuation means for the rotation limiting means, the actuation means being operable in response to an input to move the rotation limiting means from an unactuated condition to an actuated condition, the rotation limiting means including a member axially moveable between a first position corresponding to the unactuated condition of the rotation limiting means and a second position corresponding to the actuated condition.

The improved differential gear mechanism is characterized by a sensor assembly being relatively fixed relative to the outer housing and including a sensor element disposed adjacent the gear case and external thereto. The axially moveable member includes a sensed portion which causes a first electrical output from the sensor element when the axially moveable member is in the first position and causes a second electrical output from the sensor element when the axially moveable member is in the second position.

In accordance with a more limited aspect of the invention, the improved differential gear mechanism is characterized by the gear case including a plurality of openings, and the axially moveable member including a plurality of connector portions, each of which extends generally radially outward through the plurality of openings, the sensed portion of the axially moveable member being disposed external to the gear case and fixed to move axially with the plurality of connector portions, as the axially moveable member moves axially.

DETAILED DESCRIPTION OF THE PREFERRED EMBODIMENT

Figure 1:
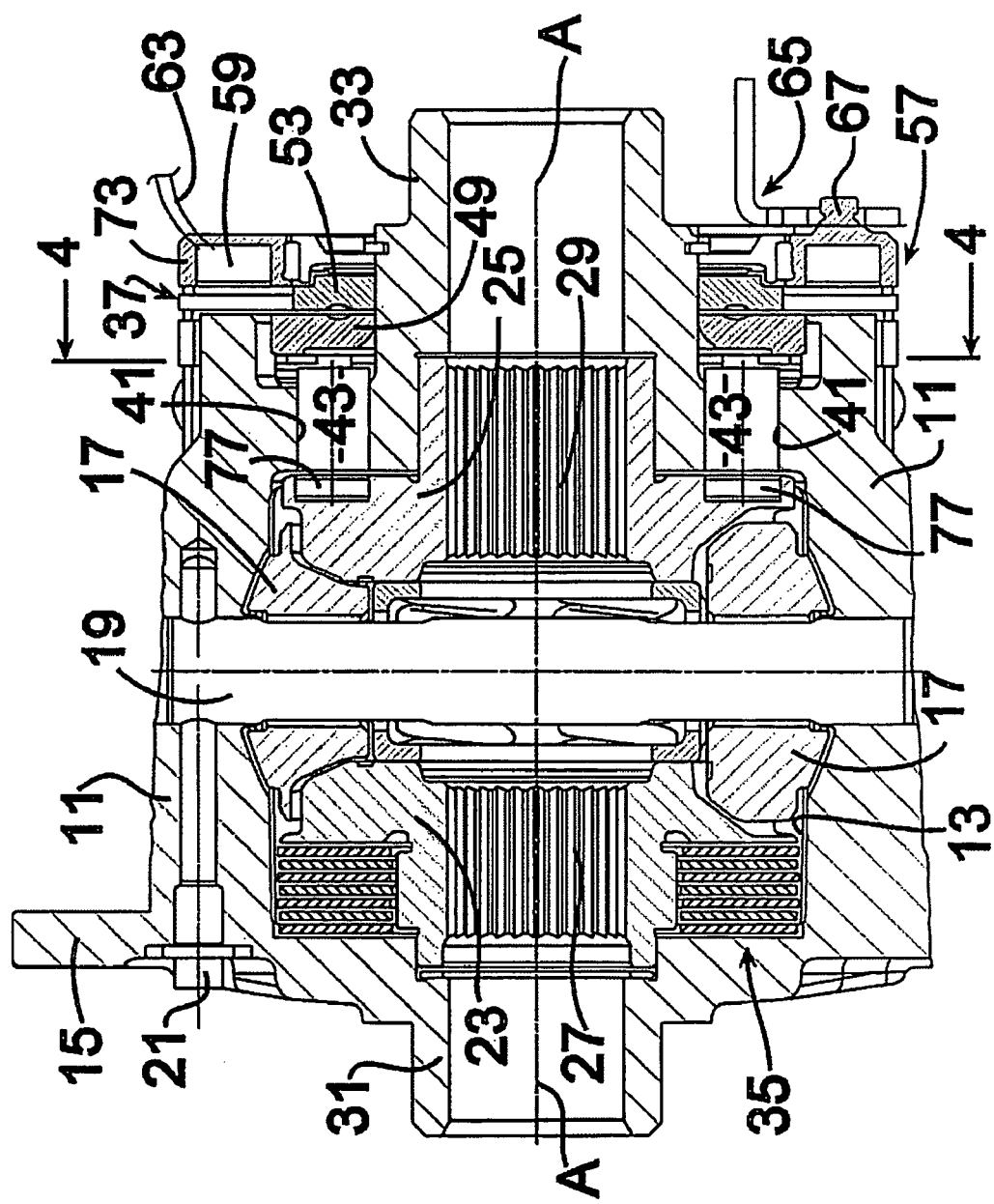
FIG. 1 is an axial cross-section of a locking differential made in accordance with the teachings of the present invention, in an unactuated, unlocked condition.

Referring now to the drawings, which are not intended to limit the invention, FIG. 1 is an axial cross-section of a locking differential including the present invention. The specific construction and operation of differentials of the general type illustrated in FIG. 1 may be better understood by reference to the above-incorporated patents.

However, as has already been noted, the usefulness of the present invention is not restricted to only locking differentials, but could be equally advantageous when used on limited slip differentials. Furthermore, the use of the present invention is not restricted to any particular configuration of differential, except as specifically noted in the appended claims.

The differential gear mechanism (locking differential) shown in FIG. 1 includes a gear case 11 which defines therein a gear chamber, generally designated 13. In the subject embodiment, and by way of example only, the gear case 11 comprises a single, unitary gear case, and all parts within the differential are inserted through a "window" W (see FIG. 2) in the gear case 11, as is well known to those skilled in the art. However, it should be understood that the present invention is not limited to any particular configuration of gear case 11, or any particular configuration of window W, or even to the presence of such a window. Torque input to the differential is typically by means of an input ring gear (not shown herein), which may be attached to a flange 15 of the gear case 11 by any suitable means, such as a plurality of bolts (also not shown herein).

Disposed within the gear chamber 13 is a differential gear set including a pair of input pinion gears 17 which are rotatably mounted on a pinion shaft 19. Typically, the pinion shaft 19 is secured relative to the gear case by any suitable means, such as a locking pin 21. The pinion gears 17 comprise the input gears of the differential gear set, and are in meshing engagement with a pair of side gears 23 and 25. The side gears 23 and 25 define sets of internal, straight splines 27 and 29, respectively, which are adapted to be in splined engagement with mating external splines of a pair of axle shafts (not shown). The gear case 11 includes annular hub portions 31 and 33 on which may be mounted a pair of bearing sets (not shown herein) which are used to provide rotational support for the differential mechanism relative to an outer differential housing H, shown fragmentarily in FIG. 2.

As is well known to those skilled in the art, during normal straight-ahead operation of the vehicle, no differentiation occurs between the left and right side gears 23 and 25, and therefore, the pinion gears 17 do not rotate relative to the pinion shaft 19. The gear case 11, the pinion gears 17, and the side gears 23 and 25 all rotate about an axis of rotation A as a solid unit.

It should be understood that the locking differential of the present invention may be operated in either of several modes. The differential may be operated manually, i.e., wherein the driver manually selects the locked mode, such that the differential operates in the locked mode almost immediately after the vehicle begins to move. Alternatively, the locking differential may operate in an "automatic mode" wherein, by way of example only, the vehicle microprocessor senses an operating condition, such as incipient wheel slip and transmits an appropriate electrical input signal ("input") to the locking differential, thus locking side gear 25 relative to the gear case 11, to prevent any further differentiation.

Figure 5:
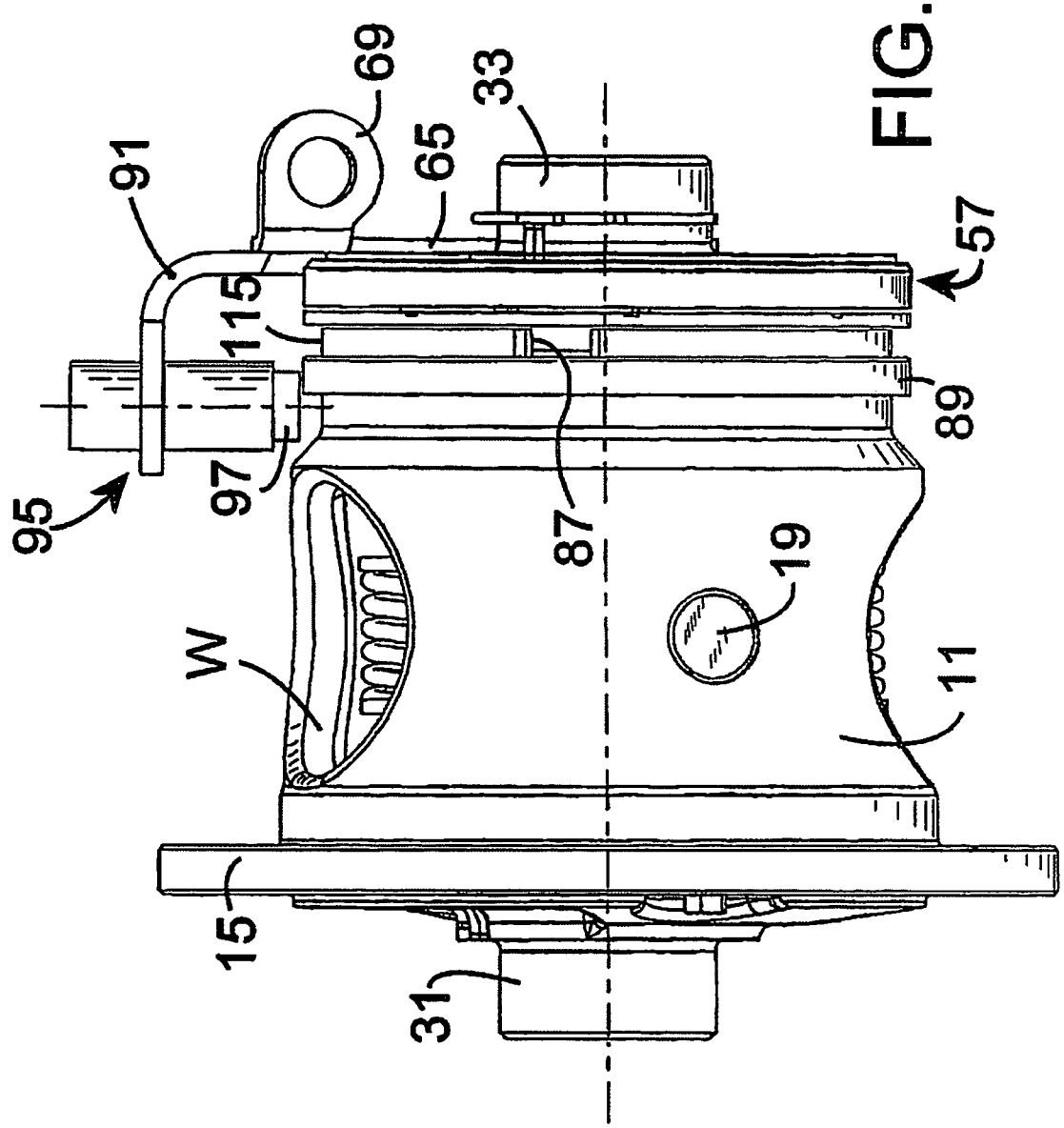
FIG. 5 is an external plan view of the locking differential of FIGS. 1 through 4, illustrating the actuated, locked condition of the differential.

In the case of the automatic mode of operation of the locking differential, it will be understood that under certain operating conditions, such as when the vehicle is turning or a slight difference in tire size exists, it is permissible for a certain amount of differentiating action to occur between the side gears 23 and 25. However, in accordance with the present invention, the locking differential may or may not include a clutch pack, or any other similar mechanism which merely retards or limits differentiating action, but instead may provide a choice between only an unactuated condition as shown in FIG. 1 and an actuated, locked condition, as shown in FIG. 5.

In the subject embodiment, and by way of example only, the locking differential does include a clutch pack, generally designated 35, which includes a plurality of clutch disks which are in splined engagement with the gear case 11, and interleaved therewith, a plurality of clutch disks which are in splined engagement with the side gear 23, in a manner which is well known to those skilled in the art, is not especially relevant to the present invention, and will not be described further herein. As a result of the presence of the clutch pack 35, the locking differential shown in FIG. 1 would typically not operate as an open differential, but would, even at relatively low speed differentials between the side gears 23 and 25, operate in the manner of a limited slip differential. However, as noted previously, the presence or absence of such slip limiting capability is not a feature of the present invention and therefore, no further reference will be made thereto subsequently.

Figure 2:
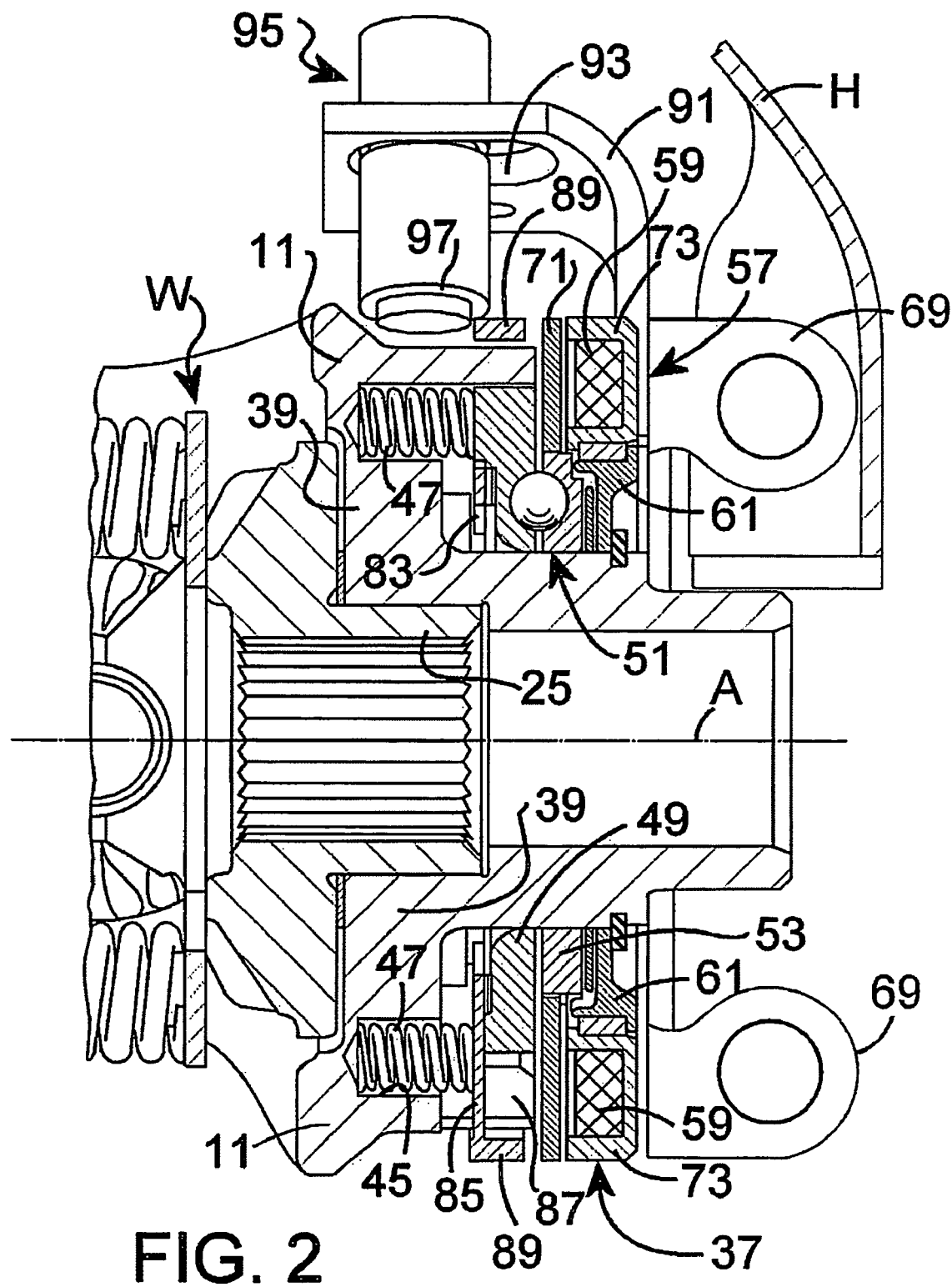
FIG. 2 is an enlarged, fragmentary, axial cross-section, similar to FIG. 1, but taken on a plane approximately perpendicular to the that of FIG. 1, illustrating one important aspect of the present invention.

Referring now primarily to FIG. 2, in conjunction with FIG. 1, the locking differential of the present invention includes a rotation limiting mechanism, generally designated 37. The rotation limiting mechanism 37 may be better understood by reference to U.S. Pat. Nos. 5,911,643 and 6,083,134, both of which are assigned to the assignee of the present invention and incorporated herein by reference. It should be understood by those skilled in the art that, because the present invention is not limited to any particular structure or mode of operation of the rotation limiting mechanism 37, the mechanism 37 will be described only briefly herein, only by way of background and example.

The gear case 11 includes an end wall 39 (see FIG. 2) which defines two arrays of bores. The first array of bores (shown in FIG. 1), comprises a plurality of pin bores 41 which extend axially through the entire extent of the end wall 39. Disposed within each of the pin bores 41 is an axially moveable, generally cylindrical pin member 43 (also referred to hereinafter, and in the appended claims, as a "lock member"). The second array of bores (see FIG. 2) comprises a plurality of spring bores 45, which extend from the right end in FIG. 2 of the end wall 39 only part way through the axial thickness of the end wall 39, such that within each spring bore 45 there is seated a coiled compression spring 47.

The right end of each of the springs 47 is seated against either an inner ramp plate 49 of a ball ramp actuator, generally designated 51, or against another member (see FIG. 3), to be described subsequently. The ball ramp actuator 51 also includes an outer plate 53, and a plurality of cam members (balls) 55 disposed between the inner plate 49 and outer plate 53 in a manner now well known to those skilled in the art of ball ramp actuators.

Disposed axially outward (to the right in FIGS. 1 and 2 from the ball ramp actuator 51) is an electromagnetic actuator, generally designated 57, which preferably comprises an annular electromagnetic coil 59 mounted on an annular support member 61. The support member 61 surrounds the larger diameter portion of the annular hub portion 33, such that the electromagnetic actuator 57 is stationary and the gear case 11 is free to rotate therein, and relative thereto. The electromagnetic actuator 57, which is shown herein by way of example only, may also be better understood by reference to the above-incorporated patents.

Actuation of the electromagnetic coil 59 occurs in response to an electrical input signal, transmitted to the coil 59 by means of a pair of electrical leads 63 (see FIG. 1), the reference numeral "63" to be used hereinafter to designate either the leads themselves, or the electrical input signal. It should be noted that the electrical leads 63 are visible only in FIG. 1.

Figure 3:
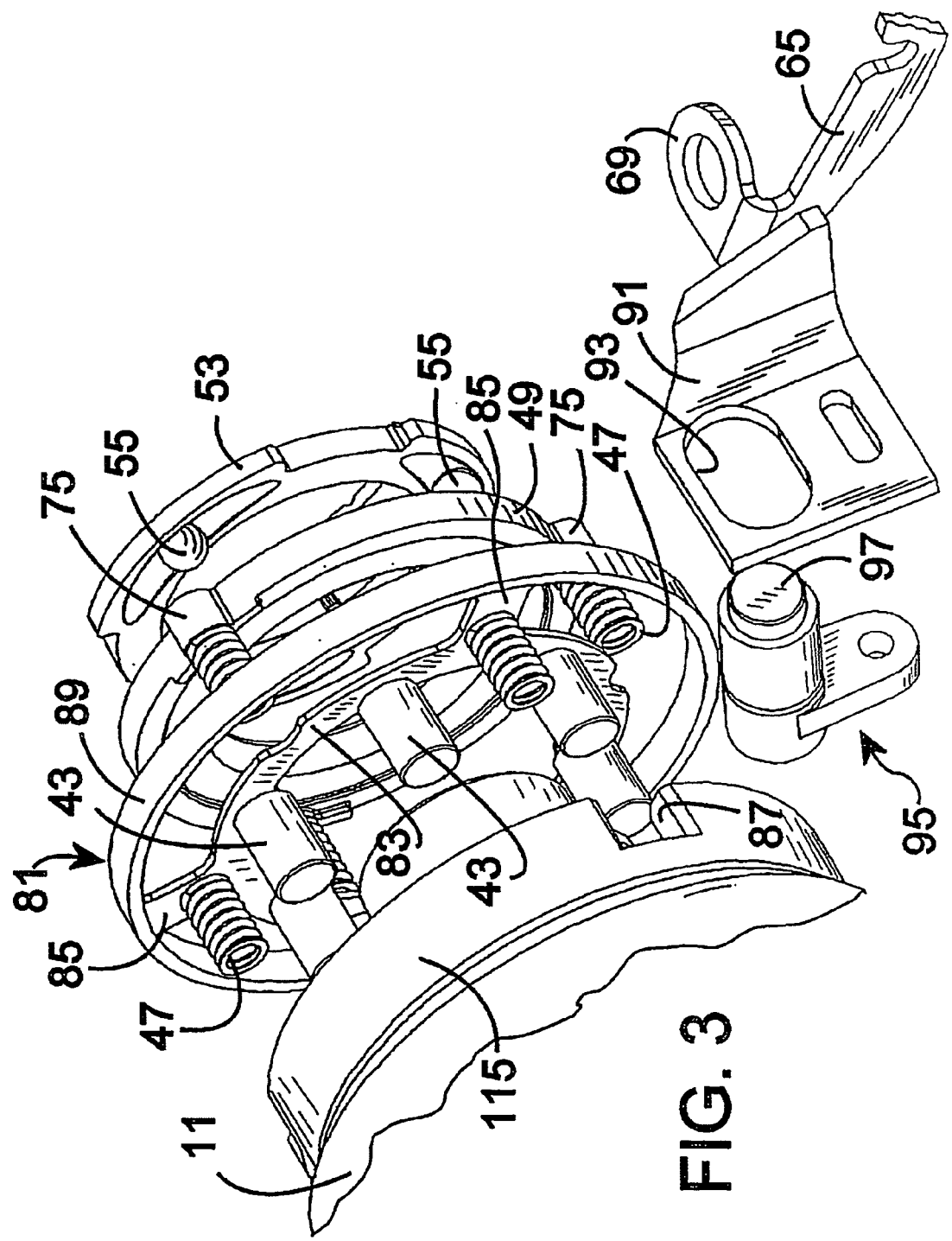
FIG. 3 is a fragmentary, exploded, perspective view of a portion of the locking differential shown in FIGS. 1 and 2, and on approximately the same scale as FIG. 1.

Preferably, the electromagnetic actuator 57 is fixed relative to the outer differential housing H by means of a bracket member 65, at least a portion of which is seen in each of FIGS. 1 through 3. The bracket member 65 is fixed relative to the electromagnetic actuator 57 by any suitable means, such as a rivet or staked portion 67 (see FIG. 1). The bracket member 65 includes a pair of axially extending tabs 69, by means of which the bracket member 65 may be bolted to the outer differential housing H as shown fragmentarily in FIG. 2.

Disposed immediately adjacent the electromagnetic coil 59 is an annular drive plate 71 which is fixed, by any suitable means such as splines (not shown herein), to be non-rotatable relative to the outer ramp plate 53. Therefore, as is now well known to those skilled in the art, and as is illustrated and described in the above-incorporated patents, when the coil 59 is energized, the resulting flux path passes through the drive plate 71 and draws the plate into frictional engagement with adjacent friction surfaces on a coil housing 73. The result is to retard rotation of the annular drive plate 71 and therefore, of the outer ramp plate 53, relative to the gear case 11. However, the inner ramp plate 49 is fixed to rotate with the gear case 11, such as by means of a plurality of plate ears 75 (see FIG. 3), and therefore, the ramping action results in leftward axial movement (in FIGS. 1-3) of the inner ramp plate 49, in opposition to the biasing force of the compression springs 47.

Referring again primarily to FIG. 1, the "outer" face of the side gear 25 (i.e., the side facing the end wall 39) defines a plurality of openings 77, the openings 77 being arranged in an array which matches, or mates with, the array of pin bores 41. Therefore, with the arrays of pin bores 41 and openings 77 circumferentially aligned, as is shown in FIG. 1, actuation of the electromagnetic coil 59 will move the inner ramp plate 49 to the left in FIG. 1, and move the pin members 43 into engagement within the openings 77, thus locking the side gear 25 relative to the gear case 11 (the actuated condition).

Most of what has been described up to this point is already known, primarily from the above-incorporated patents. Referring now to all of the drawing figures in conjunction with each other, an important aspect of the present invention will be described. As stated previously, one of the objects of this invention is to sense the occurrence of either the locked condition, or the unlocked condition (i.e., to sense the change of status of the condition), utilizing the axial movement within the differential of a member which comprises part of the locking mechanism.

In the subject embodiment, and by way of example only, the "axially moveable member" includes, among other things, the inner ramp plate 49 of the ball ramp actuator 51. Therefore, operably associated with the inner ramp plate 49 (and considered part of the "axially moveable member" for purposes of the appended claims) is a plate-like member, generally designated 81 (see FIG. 3). The plate-like member 81 includes an inner annular portion 83 (see FIGS. 2 and 3) which may actually be fixed relative to the inner ramp plate 49, but is preferably separate from the inner ramp plate 49, and is merely held against the inner ramp plate 49 by the compression springs 47, especially during the coil de-energized, unlocked condition. Once the differential is locked (i.e., the pin members 43 are disposed in the openings 77), if the coil is then de-energized, the inner ramp plate 49 may return to the position shown in FIGS. 1 and 2, and thereafter, there will be, or at least there could be, an axial "separation" between the ramp plate 49 and the plate-like member 81. Therefore, it should be understood by those skilled in the art that, although the ramp plate 49 and member 81 may be referred to as together comprising the "axially moveable member" during the actuation operation, it is really the member 81 which, in the subject embodiment, is of greater interest in regard to the sensing operation to be described subsequently.

Figure 4:
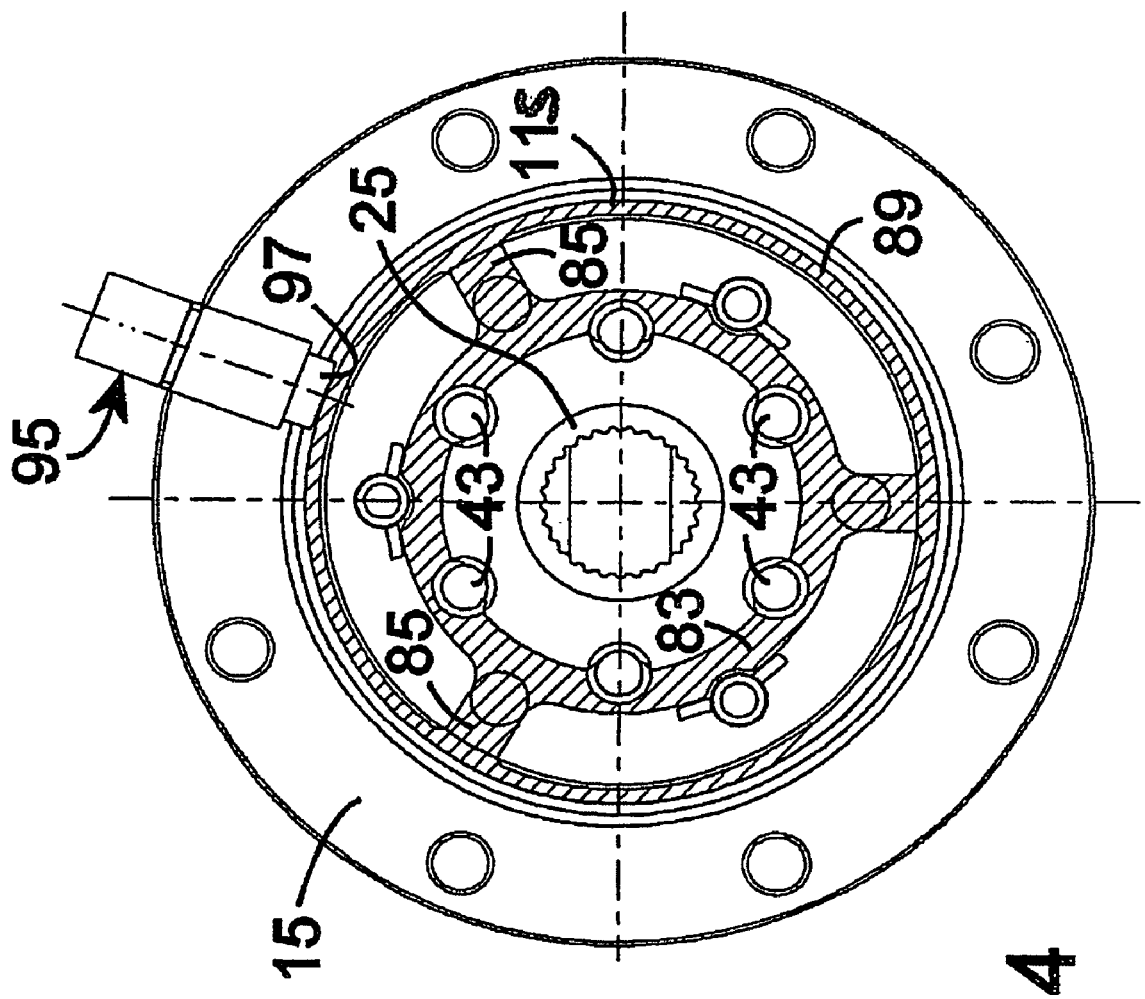
FIG. 4 is a transverse cross-section, taken on line 4-4 of FIG. 1, and illustrating primarily one part of the axially moveable member which comprises one important aspect of the present invention.

The plate-like member 81 also includes a plurality of radially extending connector portions 85 which, as may best be seen in FIGS. 2 and 3, extend radially through mating windows or openings 87 defined by the annular portion of the gear case 11, i.e., that portion of the gear case which is disposed just to the right of the end wall 39, and which surrounds the inner ramp plate 49. At the radially outer ends of the connector portions 85 is a generally annular sensed member 89 which surrounds an annular outer surface 11S (see FIGS. 3, 4 and 5) of the gear case 11, and is closely spaced apart relative to that surface. In the subject embodiment, and by way of example only, the plate-like member 81 comprises a single, unitary sheet metal stamping, such that the inner annular portion 83, the connector portions 85 and the annular sensed member 89 move in unison as a single piece. Therefore, the axial location of the annular sensed member 89 is fully representative of the axial location of the pin members 43, and therefore, is an accurate indicator of whether the pin members 43 are in the unlocked condition of FIG. 1 or the locked condition, engaging the openings 77 as described above, as is represented in FIG. 5.

Referring now primarily to FIGS. 2, 3 and 5, it may be seen that the bracket member 65 has, attached thereto, a sensor bracket portion 91 which defines an opening 93 therein. Attached to the sensor bracket portion 91 is a sensor assembly, generally designated 95, including a sensor element 97. Preferably, the sensor element 97 is disposed to be closely spaced apart from an outer surface of the annular sensed member 89 (as best shown in FIG. 5), whenever the plate-like member 81 is moved axially to the left in FIGS. 1 through 3, such that the annular sensed member 89 is in at least partial alignment with the sensor element 97, i.e., the position shown in FIG. 5. Those skilled in the sensor art will understand that the relative positions of the sensed member 89 and sensor element 97 are not critical to the invention.

In the subject embodiment, and by way of example only, the sensor assembly 95 comprises a Hall Effect sensor of the type which is now well known to those skilled in the sensor art, although it should be understood that the present invention is not limited to any particular kind of sensor assembly or sensor element. For example, the sensor assembly 95 could comprise either a conventional Hall Effect sensor, or a "differential" type Hall Effect sensor, or any one of a number of other sensor types which are capable of sensing relative movement between two members and generating a corresponding electrical output signal. What is essential to the present invention is merely that there be provided a sensor assembly which is capable of sensing the movement of the annular sensed member 89 from its right hand most position shown in FIG. 2 to its left hand position shown in FIG. 5, corresponding to the actuated or locked condition of the rotation limiting mechanism 37. What is also essential to the present invention is that the sensor assembly 95 be able to generate an electrical signal (output signal) such that the associated control logic (e.g., the vehicle microprocessor) is able, as a result of the output signal, to discern the difference between the right hand most (unactuated) and the left hand most (actuated) conditions of the rotation limiting mechanism 37.

Although the electromagnetic coil 59 and the sensor assembly 95 are illustrated and described herein as being fixed (e.g., bolted) to a portion of the outer differential housing H, it should be understood that the invention is not so limited. However, the relationship of the sensor assembly 95 to the housing H is referred to hereinafter, in the appended claims, as being "relatively fixed" which should clearly be understood not to require that the sensor assembly 95 be directly attached to the housing H. What is important is that the sensor assembly 95 be located such that, in spite of tolerances in the location of the differential within the housing H, the sensor element 97 is positioned accurately enough, relative to the sensed member 89, to provide the desired position feedback signal. It should be noted that the electromagnetic actuator 57 is also referred to as being "relatively fixed" relative to the gear case 11, again to convey the meaning that the actuator 57 should have little or no movement relative to the gear case 11, but would typically not actually be attached to the gear case 11.

In accordance with another aspect of the invention, and as may best be seen in FIG. 5, the annular outer surface 11S of the gear case 11 is designed and sized such that, even with the annular sensed member 89 in place and surrounding the surface 11S, the outer diameter of the sensed member 89 is still less than the outer diameter of the main portion of the gear case 11. Therefore, in the axle assembly plant, the ring gear may be installed over the differential assembly (what is seen in FIG. 5, minus the actuator 57, the bracket member 65, and the sensor assembly 95), and bolted to the flange 15. The bracket member 65 (including the actuator 57 and the sensor assembly 95) is bolted in place within the outer housing H, and then the differential assembly is installed within the housing H, resulting in the spatial relationship shown in FIG. 5.

Figure 6:
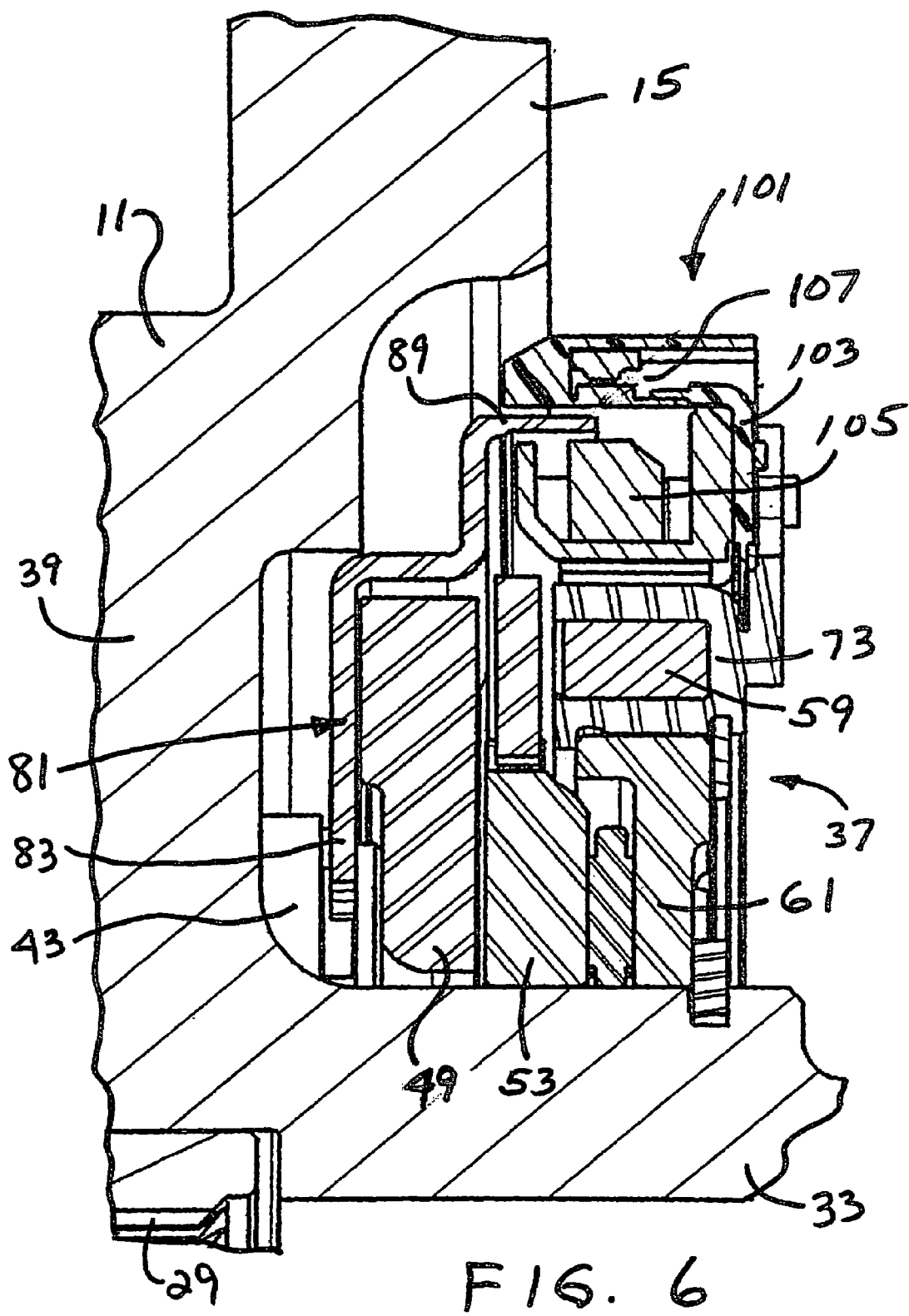
FIG. 6 is a greatly enlarged, fragmentary, axial cross-section, similar to FIG. 2, but showing an alternative embodiment of the present invention.

Referring now primarily to FIG. 6, there is illustrated an alternative embodiment of the invention in which the same, or similar, elements bear the same numeral as in the main embodiment, and new elements bear reference numerals in excess of "100". As should be apparent to those skilled in the art, especially from viewing FIGS. 2 and 5, there are likely to be a number of axle assemblies in which there is not enough space, especially in the radial direction, for the sensor assembly 95, as shown and arranged in the main embodiment.

Thus, in the alternative embodiment of FIG. 6, there is a sensor assembly, generally designated 101, disposed radially outward from the electromagnetic coil 59, and preferably, mounted or attached directly to the coil housing 73. The sensor assembly 101 includes a housing 103 and disposed therein, a permanent magnet 105. Disposed radially outward from the permanent magnet 105 is a Hall Effect sensor 107, such that the annular sensed member (also called a "target") 89 is disposed radially between the permanent magnet 105 and the Hall Effect sensor 107. As a result, whenever the locking differential changes from the unlocked condition (as shown in FIG. 6) to the locked condition (with the inner ball ramp plate 49 moving to the left), the movement of the sensed member 89 to the left from the position shown in FIG. 6 causes a variation in the magnetic field strength between the magnet 105 and the sensor 107, and thus a changing electrical output signal.

It has been observed, in connection with the development of the alternative embodiment, that this arrangement may result in a decrease in the amount of "noise" transmitted from the electromagnetic coil 59 to the permanent magnet 105 which forms part of the sensor assembly 101. In addition, the arrangement of FIG. 6 is clearly more compact, and eliminates the packaging problem of having some portion of the sensor assembly disposed external to the outer diameter of the gear case 11. Finally, although the outer differential housing H is not shown in FIG. 6, it should be apparent that both the actuator assembly 57 and the sensor assembly 101 are still considered to be "relatively fixed" relative to the outer differential housing H.

As was explained in connection with the main embodiment, the particular sensor technology utilized (Hall Effect versus some other type of sensor) is not essential to the invention. Instead, what is essential is to arrange a sensor assembly, external to the gear case 11, to be able to sense axial movement of an element (axially moveable member) within the limited slip or locking differential, which, in the subject embodiments, involves having a sensed member move with the axially moveable member, and include a portion extending out of the gear case to a location adjacent the sensor assembly. Furthermore, it is an important aspect or benefit of the invention to provide the axially moveable member and the sensor assembly, configured and arranged such that the overall package size of the differential is not undesirably increased.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism including a gear case rotatably disposed within an outer housing and defining an axis of rotation, and a gear chamber; differential gearing disposed in said gear chamber including at least one input gear and first and second output gears; means operable to limit rotation of said first output gear relative to said gear case for common rotation therewith; actuation means for said means operable to limit rotation, said actuation means being operable in response to an input, to move said rotation limiting means from an unactuated condition to an actuated condition, said means operable to limit rotation including an axially moveable member between a first position corresponding to said unactuated condition of said rotation limiting means, and a second position corresponding to said actuated condition, characterized by:

(a) a sensor assembly being fixedly mounted to said outer housing and including a sensor element disposed adjacent said gear case and external thereto;
    (b) said axially moveable member including a sensed portion which causes a first electrical output from said sensor element when said axially moveable member is in said first position and causes a second electrical output from said sensor element when said axially moveable member is in said second position.

2. A differential gear mechanism as claimed in claim 1, characterized by a bracket member disposed adjacent said gear case and fixed relative to said outer housing, said bracket member including a sensor bracket portion disposed adjacent an annular outer surface of said gear case and operable to position said sensor element of said sensor assembly adjacent said sensed portion of said axially moveable member.

3. A differential gear mechanism as claimed in claim 1, characterized by said means operable to limit rotation of said first output gear relative to said gear case includes a plurality of lock members disposed within openings defined by said gear case, and axially moveable from an unlocked position to a locked position in engagement with mating openings defined by said first output gear.

4. A differential gear mechanism as claimed in claim 3, characterized by said means operable to limit rotation of said first output gear relative to said gear case further including a plate-like member, said plurality of lock members being moveable with said plate-like member, and said plate-like member comprising part of said axially moveable member.

5. A differential gear mechanism as claimed in claim 1, characterized by said gear case including a plurality of openings, said axially moveable member including a plurality of connector portions, each of said connector portions extending generally radially outward through said plurality of openings, said sensed portion of said axially moveable member being disposed external to said gear case and fixed to move axially with said plurality of connector portions, as said axially moveable member moves axially.

6. A differential gear mechanism as claimed in claim 5, characterized by said sensed portion comprising a generally annular sensed member surrounding said gear case, and being closely spaced relative thereto, said sensor element being disposed immediately radially outward from at least a portion of said annular sensed member, when said axially movable member is in said second position.

7. A differential gear mechanism as claimed in claim 1, characterized by said sensed portion comprising a generally annular sensed member disposed axially adjacent an end wall of said gear case, said sensor assembly being disposed both radially inward and radially outward from said sensed member.

8. A differential gear mechanism as claimed in claim 7, characterized by said actuation means comprising an annular electromagnetic coil disposed axially adjacent said means operable to limit rotation of said first output gear, a bracket member including means operable to maintain said electromagnetic coil fixed relative to said outer housing and relatively fixed relative to said gear case.

9. A differential gear mechanism as claimed in claim 7, characterized by said rotation limiting means comprises and electromagnetic coil being disposed adjacent said end wall of said gear case, and said sensor assembly is disposed radially outward from said electromagnetic coil.

10. A differential gear mechanism as claimed in claim 9, characterized by said electromagnetic coil includes a generally annular coil housing, and said sensor assembly includes a sensor housing fixed relative to said coil housing.

* * * * *